United States Patent [19]

MacDonald

[11] Patent Number: 4,979,571
[45] Date of Patent: Dec. 25, 1990

[54] FOAM PRODUCING APPARATUS AND METHOD FOR EMERGENCY FOAM DELIVERY SYSTEMS

[76] Inventor: Alan B. MacDonald, 1473 Leafy La., Paradise, Calif. 95969

[21] Appl. No.: 283,390

[22] Filed: Dec. 12, 1988

[51] Int. Cl.$^5$ ............................................. A62C 1/00
[52] U.S. Cl. ...................................... 169/44; 169/14; 169/15; 169/47; 169/53; 244/136
[58] Field of Search .............. 169/44, 14, 15, 47, 169/53; 244/136

[56] References Cited

U.S. PATENT DOCUMENTS

| | | | |
|---|---|---|---|
| 205,942 | 7/1878 | Graham | 169/44 |
| 2,259,500 | 10/1941 | Thompson | 169/14 |
| 2,327,335 | 8/1943 | Boerner et al. | 169/14 |
| 2,341,437 | 2/1944 | Getz | 169/44 |
| 2,852,032 | 9/1958 | Moore | 169/14 |
| 3,220,482 | 11/1965 | Eveleth | 169/47 |
| 3,273,651 | 9/1966 | Andrews | 169/53 |
| 3,494,423 | 2/1970 | Stansbury et al. | 169/43 |
| 3,565,801 | 2/1971 | Birchall et al. | 169/44 |
| 3,677,347 | 7/1972 | Rosen et al. | 169/44 |
| 3,692,117 | 9/1972 | Wright | 169/44 |
| 3,754,601 | 8/1973 | Linkewich | 169/44 |
| 3,920,184 | 11/1975 | Waldrum | 239/10 |
| 3,936,018 | 2/1976 | Barlow | 244/136 |
| 4,090,567 | 5/1978 | Tomlinson | 169/53 |
| 4,248,733 | 2/1981 | States, Sr. | 169/47 |
| 4,477,289 | 10/1984 | Kurtgis | 134/34 |
| 4,589,614 | 5/1986 | Stevens | 244/136 |

FOREIGN PATENT DOCUMENTS

| | | | |
|---|---|---|---|
| 3008245 | 9/1981 | Fed. Rep. of Germany | 169/44 |
| 923556 | 5/1982 | U.S.S.R. | 169/53 |
| 1247557 | 7/1986 | U.S.S.R. | 169/44 |
| 2133688 | 8/1984 | United Kingdom | 165/53 |

Primary Examiner—Joseph F. Peters, Jr.
Assistant Examiner—Christopher P. Ellis

[57] ABSTRACT

An apparatus and a method are provided for producing a delayed foaming action in mixed liquids useful as suppressants for fire area control and curtailment of chemical spills. The apparatus is self-powered and sized to be transported to a target area by a variety of land and sea vehicles as delivery platforms. The apparatus is particularly designed for airborne delivery and is especially adaptable to helicopter applications.

25 Claims, 7 Drawing Sheets

FOAM PRODUCING APPARATUS AND METHOD FOR EMERGENCY FOAM DELIVERY SYSTEMS

BACKGROUND OF THE INVENTION

1. Field of the Invention

This invention relates to hazard spill suppressant and fire retardant delivery systems having equipment useful for quickly supplying and directing a suppressing mixture directly on a hazardous spill or a flaming area. The invention also relates to any equipment for producing a sprayable foam and to foam delivery systems. The form of the present invention primarily addresses airborne delivery of foam hazardous spill suppressants and foam fire retardants using a helicopter for a delivery platform.

2. Description of the Prior Art

The somewhat limited lifting capacity of the average helicopter has in the past prevented it from receiving widespread acceptance as an effective platform for applying a suppressing mixture to a chemical spill and as effective fire-fighting equipment. Only recently has the use of expandable foams been approved for forestry type fire suppression. This approval has enabled the helicopter to become not only effective, but economically competitive with large fixed wing fire bombers for fire fighting. The advantages of applying foam suppressants to chemical spill areas from the safety of the cabin closure of a helicopter with oxygen masks available can also now be realized.

Until now foam delivery equipment having a useful capacity and of a design compatible with helicopters has not been available. Liquid retardant delivery devices seen in past art patents are mostly designed for fixed wing aircraft or for heavy duty helicopters such as the Sikorsky S64F and for crane types having double rotors. Most tank systems designed for helicopters require frequent recharging and those systems seen in past art patents providing a foam mixture use rotor downwash to produce the foam. Some systems use rotor downwash to distribute foam retardant directly under the helicopter, very dangerous and unapproved for fire fighting.

To examine past art patents for airborne delivery of retardants showing methods and apparatus, especially delivery by helicopter, a patent search was conducted in the classes and subclasses 339/171.

Disclosures seen in the following patents, if not necessarily pertinent to my invention, provide a cross-section of available equipment and fire retardant delivery systems.

In a patent, U.S. Pat. No. 3,220,482, issued to K. A. Eveleth, Nov. 3, 1965, an early water tank system for use on a helicopter is shown. The tanks are cumbersome, the spray nuzzle is held and directed manually by a passenger, and the downwash of the rotor disburses the spray.

W. O. Andrews, in U.S. Pat. No. 3,273,651, dated Sept. 20, 1966, shows a large water tank with hoses to be lifted and delivered to a fire area by a heavy duty large double bladed helicopter.

U.S. Pat. No. 3,494,423, granted R. S. Stansbury et al on Feb. 10, 1970, illustrates a boom and nozzle attached at the front of a helicopter for spraying a premixed fire retardant liquid. The fire retardant liquid described as commercially available is passed through screens in the nozzle to produce a foam-like discharge which is disbursed by rotor down draft.

The A. Linkewich patent, U.S. Pat. No. 3,754,601, dated Aug. 28, 1973, describes double tanking where a measured amount of retardant material is mixed with water. His system is primarily designed for fire bombing by winged aircraft. This is a water-retardant mix which does not produce a foam.

Other patents of interest included Waldrum, U.S. Pat. No. 3,920,184, helicopter hydraulic planting; Barlow, U.S. Pat. No. 3,936,018, a helicopter agricultural sprayer; Tomlinson, U.S. Pat. No. 4,090,567, a crane-type fire fighting helicopter; Kurtgis, U.S. Pat. No. 4,477,289, washing high voltage insulators by helicopter; and Stevens, U.S. Pat. No. 4,589,614, a pick up tank under a helicopter for aerial burning and fire control.

In the past art patents examined, no methods and apparatus were seen capable of quick-mixing water, a retardant, and a liquified gas to provide an expanding foam that can be directed from a helicopter to a precise location well beyond the effects of the rotor wash. Rotor downwash distribution, seen in many past art patents, is not acceptable to fire fighting agencies because of the hazardous effect created by rotor downwash. Rotor downwash can restart a controlled fire, expand a going fire, distribute burning embers, and create a real danger to fire fighters on the ground. In chemical spills, rotor downwash might tend to widen the spill area and greatly increase the danger from chemical cloud distribution.

SUMMARY OF THE INVENTION

Therefore, in practicing my invention, I provide a method for mixing a foam producing concentrate with a liquid, pressurizing the mix in a closed system, then charged the mix with a liquified gas. The end product is a slurry under pressure having a delayed foaming action. The slurry can be jetted considerable distance in columnar flow form before expanding and foaming. My method of gas charging to produce foaming greatly increases the useful volume of foam produced. Area coverage is considerably increased by the foam produced in my method when compared with liquid sprays and other foaming procedures.

Although a variety of apparatuses can produce the delayed foaming using my method, the preferred embodiment of the immediate invention includes the following elements: A contained liquid source. A liquid flow circuitry conduit system having an opened input end and an opened output end. A conduit attachment from the contained liquid source to the input end of the liquid flow circuitry conduit system. Mechanics for drawing the liquid from the contained liquid source and moving the liquid through the circuitry conduit system. A contained foam producing concentrate source. A conduit attachment from the foam producing concentrate source through a measuring and proportioning device opening into the liquid flow circuitry conduit system. A mixing and pressurizing device inserted into the circuitry conduit system. An on/off flow controlling device connected after the mixing and pressurizing device as part of the circuitry conduit system. Controllable connective access to a liquified gas source, preferably a $CO_2$ cylinder. A gas injection and mixing chamber as a part of the circuitry conduit system after the on/off flow controlling device. The gas injection and mixing chamber being of sufficient tensile strength to contain a highly pressurized gas charged liquid and foam producing concentrate mixture. A conduit attachment from the controllable connective access of the liquified gas source to the gas injection and mixing chamber. A high pressure passageway for a fluid through a directional control device attached at the output end of the circuitry system, the directional control device preferably a two axis monitor. An exiting passageway from the directional control device through a stream conditioning device, preferably a columnar flow nozzle.

The liquid can be any liquid or liquid composition which will flow freely through confining conduits and mix freely with other compounds. For the applications hereinafter described, water is the primary choice. A liquid source includes rivers, lakes, ponds, fire hydrants, piped systems, tanks, and the like. Contained refers to recessed land features where water accumulates or passes, to piping systems, to barrels, to tanks, and the like, and herein particularly to a portable water tank. A foam producing concentrate can include any foam producing materials in liquid or dry form which mix readily with other liquids. In this application, the apparatus and method are directed towards use of available premixed liquid foam producing concentrates.

The actual structure of the apparatus and arrangement of operational parts is immaterial so long as the apparatus of this invention is entirely self-contained and useful in the same configuration for attachment to a variety of vehicles. Particularly for a helicopter, the water tank, which is also the main housing, is formed in a reversed saddle structured having two principal tank sections substantially rectangular shaped and positioned in parallel longitudinal alignment horizontally disposed. The two principal tank sections extend upwardly as continuations of outer sides of a flattened top V-bottom center platform. There is open inside communication between the center platform and the two principal tank sections producing a large capacity single water tank. In this application, the water tank is sized for helicopter installation and the particular structure of the water tank allows it to be attached to existing hard points on the helicopter directly behind the fire wall of the helicopter pilot housing by attachment brackets. The helicopter center of gravity is considered when attaching the water tank so filling and discharging the water tank will not effect helicopter stability. Although a variety of methods for refilling the water tank are available, in this application, a self-powered float snorkel is used. The float snorkel is stored in a bell-like housing, as is the liquified gas cylinder, in sealed compartments inside the tank section on the left hand side of the helicopter pilot housing. The foam producing concentrate container and the booster pump motoring device fuel tank are in sealed compartments in the tank section to the right hand side of the helicopter pilot housing. The booster pump, the booster pump motoring device, the various valves, on/off and proportioning, the liquified gas injection chamber, conduits and control attachments are normally positioned adjacently in front of the tank section on the right hand said of the pilot housing. The high pressure output line, also on the right hand side of the helicopter pilot housing, extends from the liquified gas injection chamber forward to the monitor and nozzle with the nozzle being positioned so the discharge end is somewhat advanced past the up turned front end of the right hand helicopter skid. Controls for turning the spray on and off and for adjusting the nozzle are on the helicopter control stick. All other electrical controls are in a console placeable between the helicopter seats.

For filling and refilling the water tank a hose and reel are fastened to the tank top on the left hand side section of the water tank. The water tank can be fill from a fire hydrant, by suction pump through the system, or by a self-powered float snorkel. The float snorkel which can be lowered and raised by a small electric motor is positioned in a bell-like container opened up through the bottom of the water tank housing to the left of the helicopter pilot housing. Though not all illustrated in the drawings, there are safety devices in the system which include an emergency water dump valve, LED operational lights, and operational limiting switches.

The method for producing the foam retardant and delivering it airborne to a target area includes the following: A helicopter as a delivery platform. The self-contained apparatus of the immediate invention mounted as described on the helicopter. The system operational with all supply tanks fully charged. Water is drawn gravitationally and by pump from the main tank and directed down a single conduit towards the pump which is a booster pump powered by an APU (an auxiliary power unit). A foam producing concentrate is drawn from the concentrate tank similarly along a small conduit line. The foam producing concentrate passes through a proportioning valve and is mixed with the water just ahead of the booster pump entrance. The foam concentrate is a commercial concentrate with the mixture and content being selected according to use. For example, an A fire which is a wood fire requires a somewhat different mix from a B fire which is gas and liquids. The selected mix for a chemical spill suppressant is also according to the chemical and spill conditions. The mixes are normally available for immediate selection.

The proportioning valve releases the foam producing concentrate in measured amounts to be mixed with the water. The water and concentrate are mixed at an approximate ratio of three gallon of foam producing concentrate to one hundred gallons of water. The mix ratio is predetermined and is adjustable to optimize the resultant foam quality. After water and concentrate blending, the resultant slurry is referred to as "mix". The mix is then drawn into the booster pump where it is thoroughly blended and pressurized. A pressure sensing on/off switch in line after the booster pump maintains an off position until a predetermined pressure is reached after which flow passage is turned on. The pressurized mix passes through a tubular chamber where it is charged and thoroughly mixed with injected measured amounts of liquified gas in the nature of C02. The pressurized mix charged with liquified gas is referred to as "charged mix." The pressurized charged mix is passed along in a high pressure conduit to a directional controlling monitor. From the monitor, the pressurized charged mix is discharged out through a columnar nozzle. The principal of gas-charging the mix is to produce a delay in the foaming action followed by a vast expansion of the charged mix into a foam suitable for containment of hazardous chemical spills and fires. The nozzle is designed to expel the retardant mix in a condition referred to as "columnar flow" which reduces the stream break-up caused by rotor turbulence. The foaming action of the retardant is delayed as long as feasible to enable maximum throw of the material and to escape the deflecting effect of the helicopter rotor down wash when a helicopter is used as a delivery platform. The mixing and the high velocity discharge of my method allows a stream of foaming retardant to be thrown considerable distance and directed to a target area efficiently using a helicopter as a delivery platform. As the apparatus of the immediate invention is fully self-contained, it can be effectively used with a variety of delivery vehicles.

The primary object, then, of the invention is to provide a self-contained apparatus for producing a useful and sprayable expanding foam end product with the apparatus being adaptable for use with a variety of land, sea, and air delivery vehicles, particularly helicopters.

A further object of the invention is to provide a method of quick-mixing and gas charging a large volume of fluid such as water and a small measured amount of foam producing concentrate to effect a sprayable end product of expanded foam capable of covering considerable more area then the same volume of water and water with a premixed retardant can cover.

A still further object of the invention is to provide self-contained foam spray equipment useful for delivering and spraying a target area such as a chemical spill or a forest fire with an expanded foam suppressant.

Another object of my invention is to provide foam producing and spraying equipment adaptable to helicopters which can be recharged with water from a nearby lake or river using snorkel equipment.

A further object of my invention is to provide a helicopter with a high velocity foam delivery system which does not require the helicopter to be directly over a chemical spill or a fire during foam retardant discharge.

Other objects and the many advantages of my invention will become evident from reading the specification and comparing numbered parts described with like numbered parts shown in the drawings.

DESCRIPTION OF THE PREFERRED EMBODIMENTS

Figure 1:
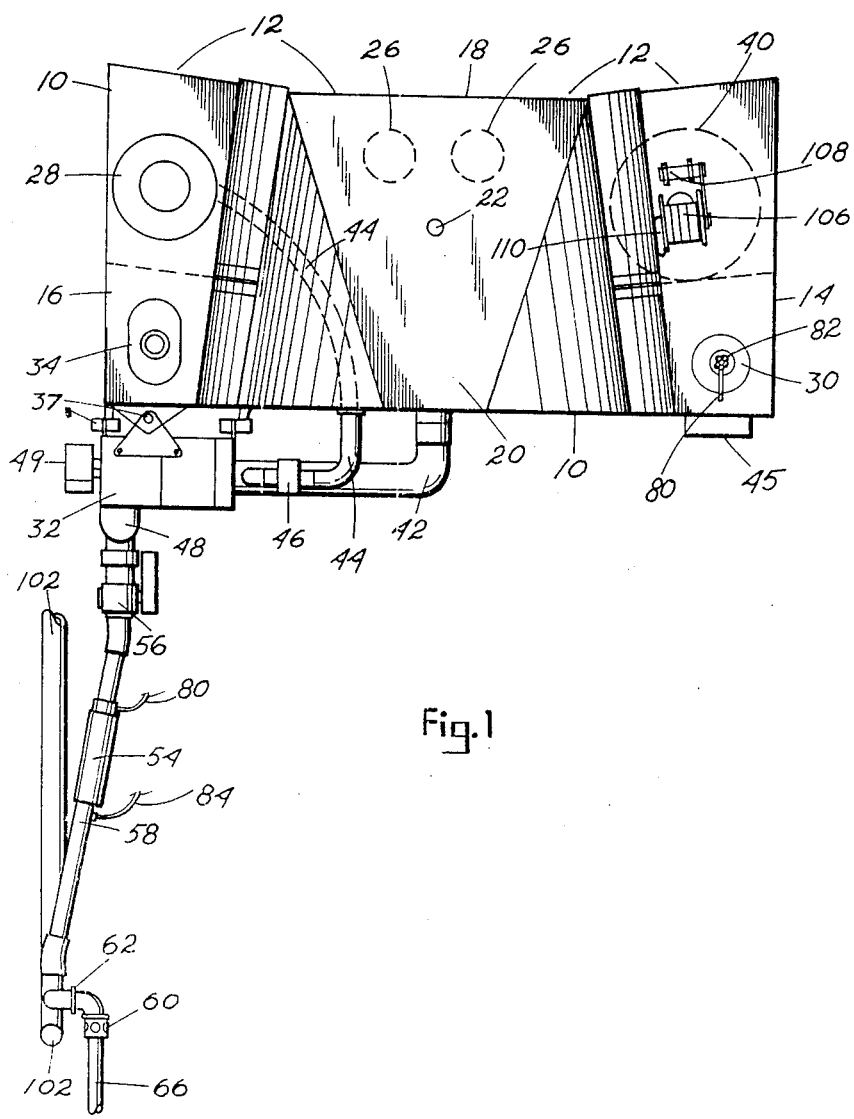
FIG. 1 is a top plan view of the sprayable foam producing apparatus configured for attachment to a helicopter as a delivery platform.
Figure 2:
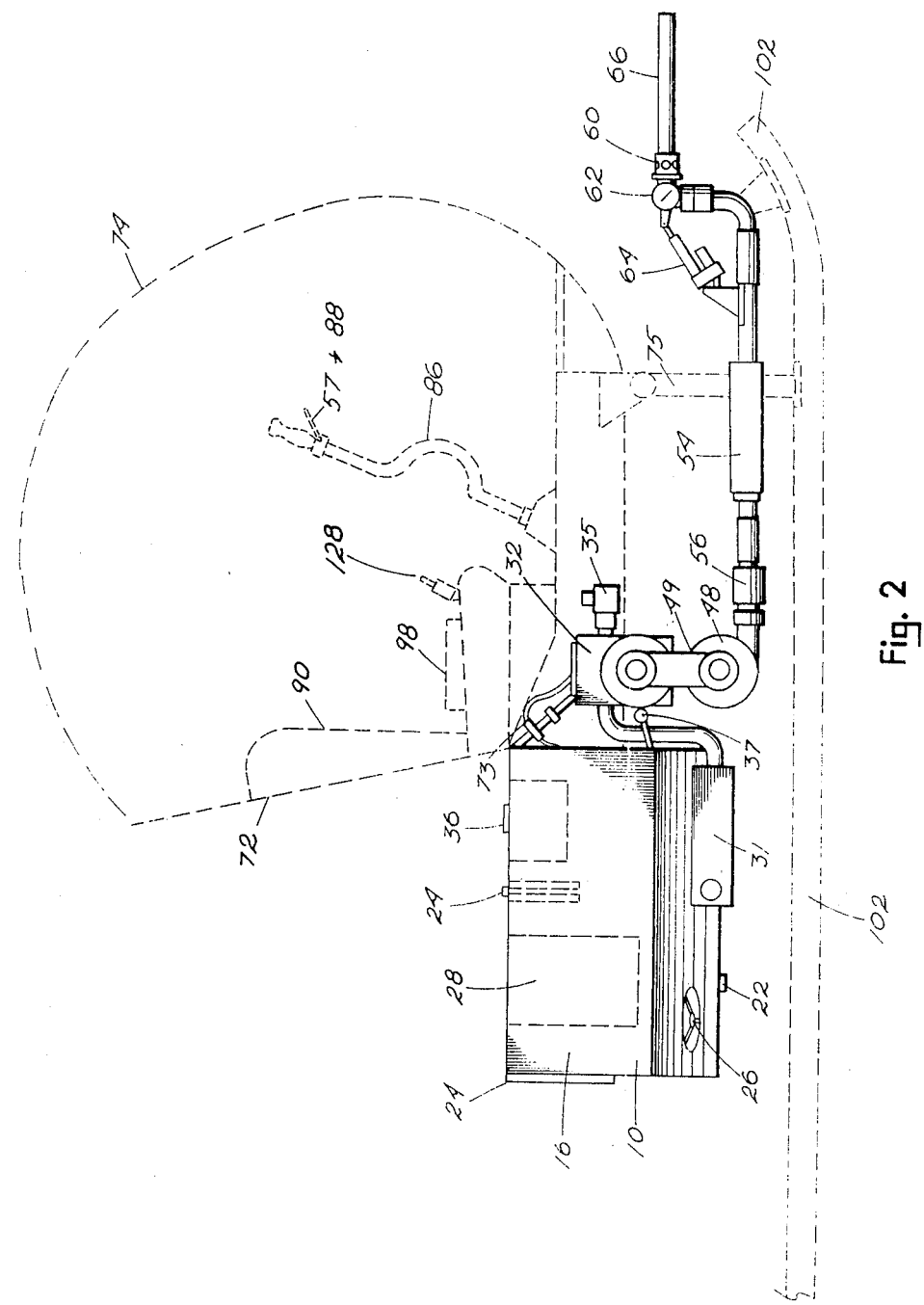
FIG. 2 is a side view of the apparatus mounted to the fuselage of a helicopter with the helicopter referenced by dotted lines.
Figure 3:
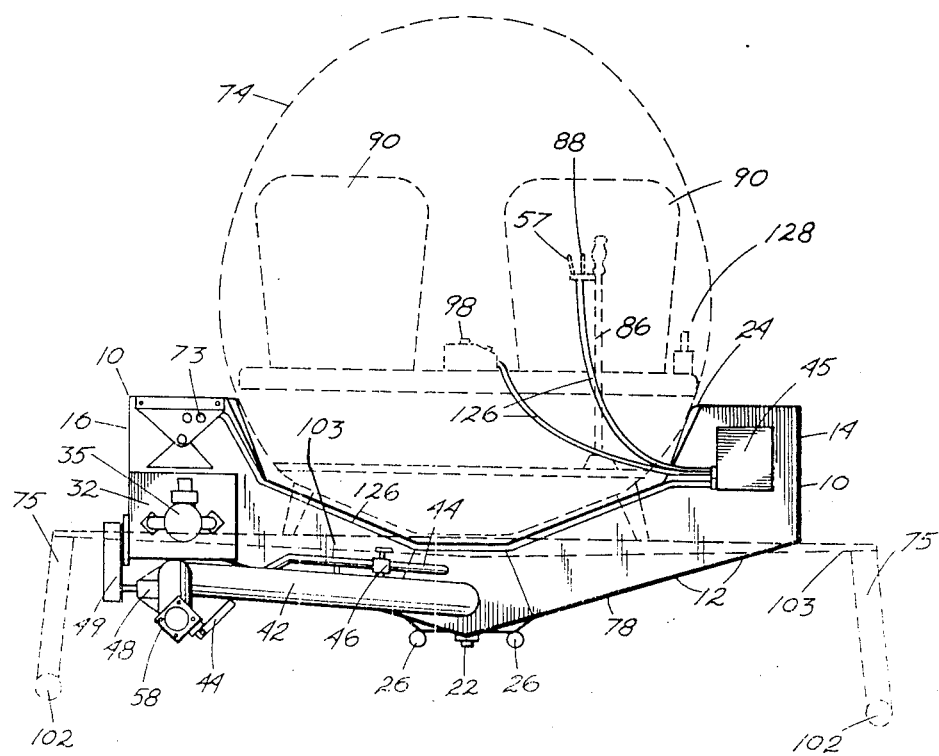
FIG. 3 is a frontal view of the helicopter mounted apparatus.

Referring now to the drawings at FIG. 1 where the apparatus of the immediate invention is shown configured for helicopter installation. A basic component of the apparatus is a fluid reservoir and although the method and apparatus described herein is not restricted to a particular fluid, the conduction of water is principally addressed in this specification with the fluid reservoir being designated water tank 10. Water tank 10 is actually a single water tank formed in a saddle structure 12 having two principal tank sections, tank section one 14 and tank section two 16, substantially rectangular shaped and positioned in parallel longitudinal alignment horizontally disposed. The two principal tank sections 14 and 16 extend upwardly as continuations of outer sides of a center platform 18. Center platform 18 is horizontally disposed and has an upwardly faced platform top surface 20 which has somewhat angled surfaces and angled side walls designed to fit helicopter 68 (see FIG. 2) and be attached by center point attachment 22 and attachment brackets 24. The underside of center platform 18 angles downwardly from the outer edges of the undersides of tank sections 14 and 16 to form platform V-bottom 78 (See FIG. 3). Although the tank sections 14 and 16 can actually be a number of individual tanks connected by conduit, in this application there is open inside communication between center platform 18 and the two principal tank sections 14 and 16 producing the large capacity single water tank 10. The angled interfaced side walls of the two principal container sections 14 and 16 are affixed in at least four places with attachment brackets 24. Water tank 10 is shaped for helicopter 68 installation and the particular structure of water tank 10 allows it to be attached to existing fuselage hard points 70 on the helicopter directly behind fire wall 72 of helicopter pilot housing 74 by attachment brackets 24. In attaching water tank 10 to helicopter 68, the center of gravity of helicopter 68 is considered.

In sealed compartments inside water tank 10 is foam producing concentrate tank 28, liquified gas cylinder 30 (for a C02 type gas), APU fuel tank 34, and downwardly opened bell-like snorkel housing 40 for a retractable self-powered float snorkel 104. Although these components can function as connected separate units, compartmenting them in water tank 10 both compacts and somewhat streamlines the apparatus. Water conduit 42 connected in the front end of center platform 18 provides a single supply of water from water tank 10 to proportioning control valve 46. Foam producing concentrate tank 28 is compartmented in tank section one 14 of water tank 10 on the right hand side of helicopter pilot housing 74. One end of concentrate supply conduit 44 is attached to foam producing concentrate tank 28 and the other end is attached to proportioning control valve 46. Proportioning control valve 46 operates according to pressure applied through pressure sensing line 84 attached between proportioning control valve 46 and nozzle high pressure supply line 58. From proportioning control valve 46, concentrate supply conduit 44 continues and is connected into water conduit 42 at water-concentrate junction 100 just ahead of the booster pump 48 intake. Booster pump 48 is powered by belt drive 49 attached to APU 32, an auxiliary power unit. In this application, APU 32 is a gasoline powered motor attached to water tank 10 by APU isolation mounts 37. APU 32 is fueled by APU fuel line 36 from APU fuel tank 34 to APU carburetor 35. APU exhaust system 33 passes along the lower outer side of water tank section two 16 exhausting rearward relative to helicopter 68. From booster pump 48, a mix conduit 52, sized for mixed water and foam concentrate hereinafter called mix 50, is attached to flow on/off control valve 56. Flow on/off control valve 56 is a pressure sensing device which allows turn on automatically when a preset pressure is developed in the line. Mix conduit 52 continues through flow on/off control valve 56 into liquid gas injection chamber 54, a mixing chamber for introducing a C02 type gas into the system. Liquified gas cylinder 30, compartmented inside tank section one 14 on the left hand side of helicopter pilot housing 74, has liquified gas supply tube 80 affixed from liquified gas cylinder 30 through liquified gas electric on/off switch 82 to liquified gas injection chamber 54. Nozzle high pressure supply line 58 provides a passageway from liquid gas injection chamber 54 to adjustable monitor 60. Monitor 60 is opened into columnar nozzle 66 and is pivotal on monitor axis 62 providing aiming features to columnar nozzle 66. For helicopter 68 applications, columnar nozzle 66 is aimed ahead of helicopter 68 and is positioned with columnar nozzle 66 in front of helicopter cross tube 103 and helicopter skid leg 75 partly in advance of the front tip of helicopter skid 102. Columnar nozzle 66 is aimed forward and in this application is mechanically adjustable vertically by monitor electric actuator 64 moving columnar nozzle 66 up and down on monitor axis 62 as controlled by nozzle aiming control 88 on helicopter control stick 86. Columnar nozzle 66 can be controllably aimed horizontally by axial movement of helicopter 68. Flow on/off control 57 operating APU 32 (powering up the motor turns on the spray) and nozzle aiming control 88 are both on the helicopter control stick 86. For safety, water tank 10 has two emergency dump valves 26 towards the rear in platform V-bottom 78. Emergency dump valves 26 can be operated by dump valve emergency release 128 in helicopter pilot housing 74. Controls for the balance of the system are in systems control console 98 between the two helicopter seats 90 in helicopter pilot housing 74.

Figure 5:
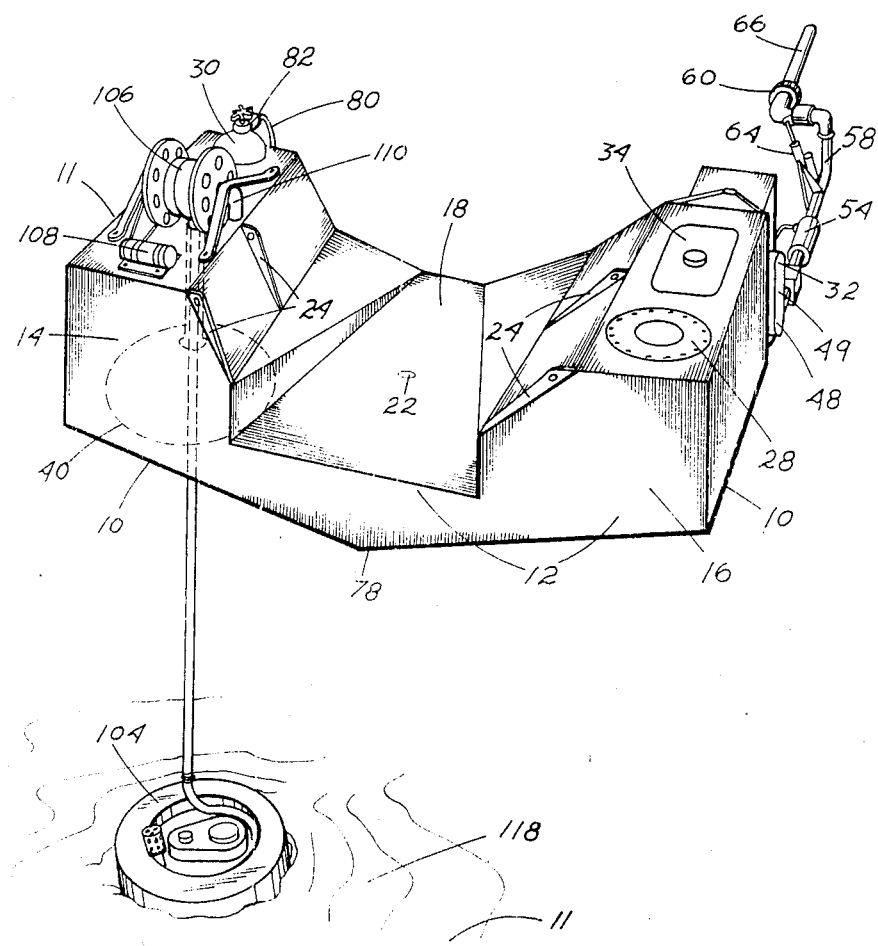
FIG. 5 is a perspective view of the principal apparatus of the invention illustrating floating snorkel mechanics and the unique housing shape of the apparatus allowing attachment to existing hard points on the helicopter fuselage to the rear of and below the pilot housing.
Figure 6:
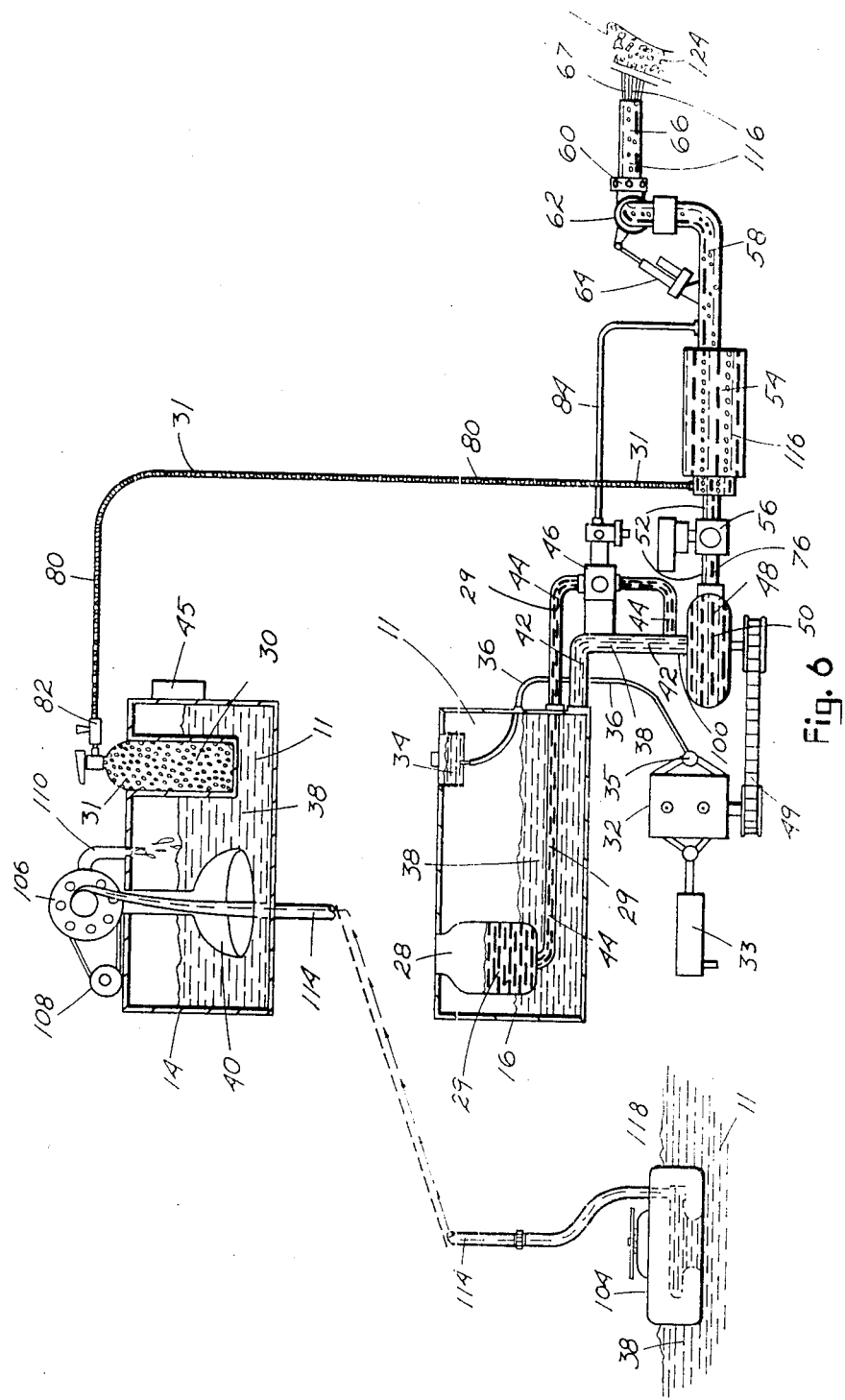
FIG. 6 illustrates the method for producing the sprayable foam in a picture diagram flow chart. The drawings also illustrate resupplying the water tank by snorkel.

Although the apparatus of the immediate invention is not restricted to water 118 as the only viable fluid 38, in this application, water 118 and fluid 38 are used interchangeably and water 118 is most commonly used. Water tank 10 can be filled and refilled from a variety of fluid sources 11. Hose reel 106 operated by electric hose reel drive motor 108 (reversible) is useful for filling water tank 10 from fire hydrant 132 (FIG. 7) and with self-powered float snorkel 104, see FIG. 5. When float snorkel 104 is used it can be lowered and raised by hose reel drive motor 108 turning hose reel 106. Float snorkel 104 can be stored in bell-like snorkel housing 40 opened up through the bottom of the water tank section one 14 on the left hand side of helicopter pilot housing 74. Self-powered float snorkel 104, in this application, can be a commercially available device and may be housed inside water tank 10 as illustrated or pulled up against the underside of the tank housing. From fluid source 11 water 118 is drawn into float snorkel 104 and forced upward through fluid delivery hose 114 to hose to tank supply 110 and into water tank 10. Connections to the motoring devices, a battery, and controls (not all shown) are included in systems electric harness 126 and are centered and fused in electronics control box 45. Systems electrical harness 126 attaches to electrical harness connectors 73 at the front of tank section two 16 to the right of helicopter pilot housing 74.

Figure 4:
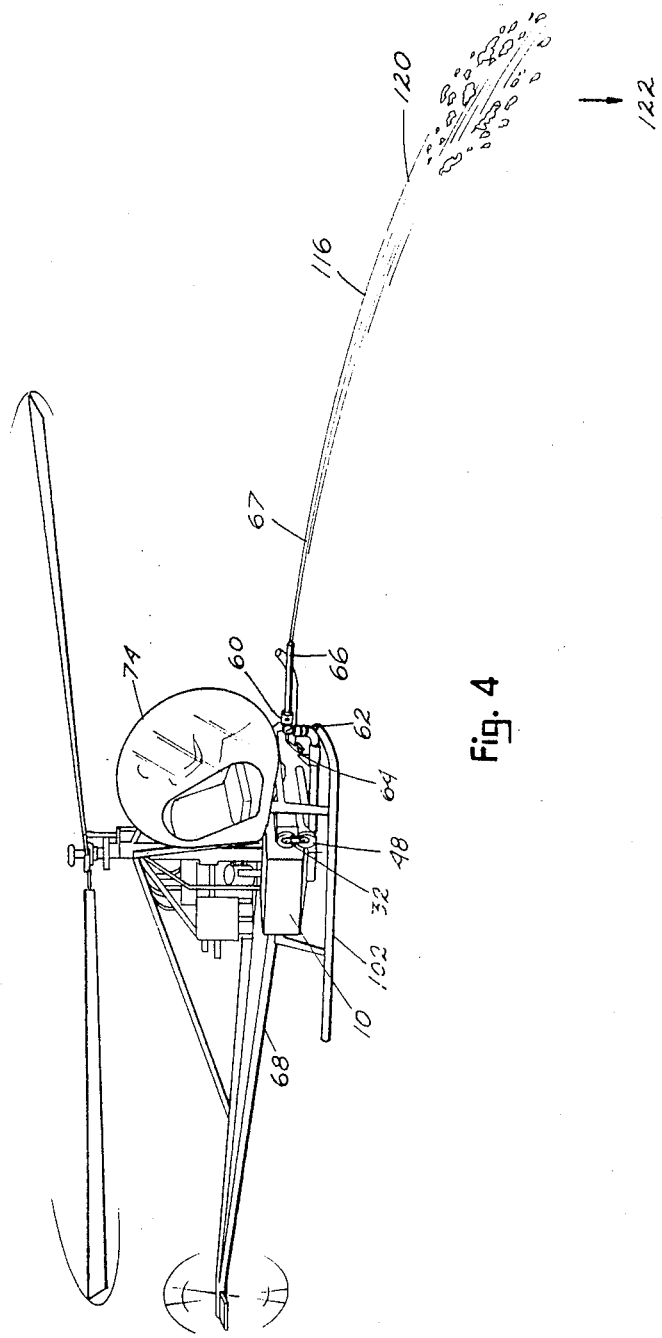
FIG. 4 illustrates the sprayable foam producing apparatus mounted to a helicopter and the method of using a helicopter as a delivery platform aiming a jet of foam spray directly at a target area.

The method provided of the present invention involves a fluid source 11, a foam producing concentrate 29, a liquified gas 31 (a C02 type gas), a fluid conducting circuit of which conduits 42, 44, 52, 58, and 80 are representative. Also required in the conduit circuitry is a proportioning device, proportioning control valve 46, which provides measured amounts of foam producing concentrate 29 for mixing with the fluid 11, water 118 in this application, at an approximate rate of three gallons of foam producing concentrate 29 to 100 gallons of water 118. Moving the mix, water 118 and foam producing concentrate 29, through the conduits and pressurizing the system is accomplished by a booster pump 48 which is positioned in the conduit circuitry immediately after the concentrate and water mix position 100. Following the pressurizing unit, booster pump 48, is a flow on/off control valve 56. Booster pump 48, belt driven by belt drive 49 connected to APU 32, thoroughly mixes water 118 and foam producing concentrate 29 and at a preset pressure sensed by flow on/off control valve 56 which then opens, passes the pressurized mix 76 along under high pressure to a gas injection chamber, liquified gas injection chamber 54. Liquified gas 31, which can be C02 or a similar gas, is measured electronically by liquified gas electric on/off switch 82 and passing along liquified gas tube 80 is mixed into the pressurized mix 76 in gas injection chamber 54. After gas injection, the mix is designated gas charged pressurized mix 116. This method of mixing, pressurizing the mix, and gas-charging the pressurized mix produces as an end product a fluid spray having a delayed foaming action which can be ejected in columnar flow (see columnar flow spray 67 in FIG. 4) considerable distance before expanding into expanded foam. When a protein foam producing concentrate 29 useful for fire suppression or chemical spill containment is the concentrate used, the end results is an expanded retardant foam 120 (see FIG. 4) which usefully covers considerably more area then the same amount of water or water premixed with a fire retardant would cover.

For helicopter use, columnar nozzle 66 is designed to expel expanded retardant foam 120 in the condition previously mentioned which is referred to as "columnar flow." This reduces the stream break-up caused by rotor turbulence. By gas charging the pressurized mix, the foaming action of the retardant is delayed and by high velocity discharge a stream of foaming retardant can be thrown considerable distance and directed to a target area 122 efficiently using helicopter 68 as a delivery platform.

To operate the system, helicopter 68 is flown in the vicinity of fire target area 122. The pilot turns on flow on/off control which is on helicopter control stick 86. Flow on/off control 86 operates the gasoline powered APU 32 which powers up and drives booster pump 48 by belt drive 49. When sufficient pressure is developed at flow on/off control valve 56 (almost immediately), valve 56 automatically opens, flow through the conduits is initiated, and a jet stream in the form of columnar flow spray 67 is ejected from columnar nozzle 66. The pilot can control the distance of the fluid throw by speeding up and slowing down APU 32. In this application, columnar nozzle 66 can be adjusted vertically by nozzle aim control 88 on helicopter control stick 86. For horizontal aiming, helicopter 68 is turned as needed.

Figure 7:
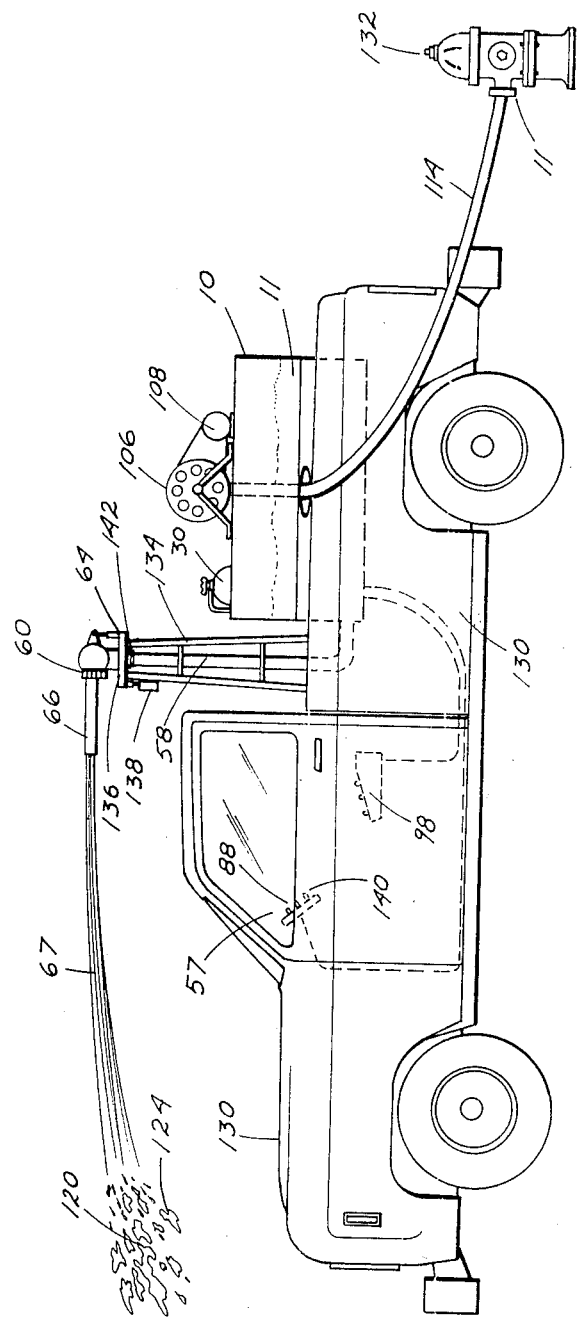
FIG. 7 illustrates the apparatus mounted on a truck with the columnar nozzle pivotally supported at the top of a boom. Liquid intake from a fireplug directly through the foam producing mechanics is shown with the foam being jetted out the columnar nozzle at a target ahead of the truck.

With only moderate modifications for attachment, water tank 10 and the apparatus of the immediate invention is useful with a variety of other delivery platforms both land and sea. In FIG. 7, the apparatus and water tank 10 is illustrated in use on a land vehicle, truck 130. Fluid intake hose 114 is shown attached to fluid source 11, fire hydrant 132. In this application, columnar nozzle 66 attached vertically adjustable to monitour 60 is supported in a position to clear the cab of truck 130 on boom 134. Columnar nozzle 66 can be turned for aiming horizontally by turning rotatable platform 136 to which monitour 60 is attached and a slip coupling 142 fitting nozzle high pressure supply line 58 to monitour 60 allows turning which is accomplished by electric platform rotate motor 138 controlled from the truck cab by platform rotation control 140. Similar to the helicopter 68 application, systems control console 98 is in the seat area in the cab of truck 130 and flow on/off control 57 and nozzle aiming control 88 are in a handy position also in the truck cab. Different from airborne applications, where there is a continuing source of water, fluid source 11 at fire hydrant 132 (FIG. 7), the apparatus of the immediate invention can keep running and producing expanded foam 124 in the form of fire retardant foam 120 so long as a supply of foam producing concentrate 29 and liquified gas 31 (a C02-type gas) is available. With water tank 10 filled with water 118, the apparatus is completely self-contained. In smoky areas for roadside grass fires the truck mounted apparatus can be operated from the truck cab with the operator protected and having a face mask and oxygen immediately available. As illustrated previously in FIG. 5, water tank 10 can be filled by self-powered float snorkel 104 which could be easily accomplished in the truck 130 application by dropping the snorkel 104 into any nearby fluid source 11, a pond, a lake, or a river. Like the truck 130 application, the same apparatus using a boat as a delivery platform and the self-powered float snorkel 104 with the unlimited water supply available under aquatic conditions, most any powered boat, large or small, can be turned into an efficient fire fighting boat. The efficiency of a foam fire retardant, not usually available in quantity on fire boats, would be immediately available in an effective volume.

In the foregoing specification, I have described a principal apparatus and a principal method of producing and delivering an expandable foam useful for a variety of conditions with particular emphasis on chemical spill suppressants and fire retardants. However, it is to be understood that the apparatus may assume a variety of applicative forms and be useful with various delivery platforms other than those mentioned in the specification and that the method for mixing ingredients to produce the delayed foaming end product is not necessarily limited to the order described and I will consider all changes made as my invention when those changes fall within the spirit and intended scope of my claims following.

What is claimed is:

1. A delayed foam producing apparatus for emergency foam delivery systems comprising:
   a contained liquid source;
   a confining liquid conducting system having a major passageway from an opened input end to an opened output end, there being input and flow affecting fixtures in spaced arrangement along said major passageway;
   a conduit attachment from said contained liquid source to said opened input end of said liquid conducting system;
   mechanics for drawing said liquid from said contained liquid source and moving said liquid through said liquid conducting system;
   means for controlling said mechanics;
   a contained foam producing concentrate source;
   a conduit affixed from said foam producing concentrate source to a measuring and proportioning device and a conduit therefrom into said major passageway attached as one of said input and flow affecting fixtures in said spaced arrangement along said major passageway;
   a mixing and pressurizing device affixed into said major passageway adjacently after said concentrate fixture being one of said input and flow affecting fixtures in said spaced arrangement along said major passageway;
   a pressure sensing flow on/off control valve immediately after said mixing and pressurizing device affixed into said major passageway being one of said input and flow affecting fixtures in said spaced arrangement along said major passageway;
   controllable access to a contained liquified gas source;
   a gas passing conduit being one of said input and flow affecting fixtures in said spaced arrangement along said major passageway connected from said controllable access to said liquified gas source to
   a gas injection and mixing chamber being one of said input and flow affecting fixtures in said spaced arrangement along said major passageway after said pressurizing device with said chamber being of sufficient tensile strength to contain a highly pressurized mixing of said liquid, said foam producing concentrate, and said liquified gas;
   said major passageway having a high pressure maintenance portion from said gas injection and mixing chamber to said opened output end;
   an adjustable fluid flow directional control device attached at said opened output end of said major passageway;
   means for initiating and controlling said fluid flow directional control device;
   an exiting stream conditioning device producing a columnar flow attached to said directional control device;
   means for replenishing a depleted liquid supply.

2. The delayed foam producing apparatus of claim 1 wherein said contained liquid source includes pools, ponds, lakes, rivers, controlled water systems, and any liquid source sufficiently restrained naturally and structurally to provide liquid, namely water, in a useful supply.

3. The delayed foam producing apparatus of claim 2 wherein said contained liquid source further includes a portable water tank.

4. The delayed foam producing apparatus of claim 1 wherein said liquid conducting system having an opened input end and an opened output end is an interacting attachment of conduits and fluid flow affecting devices.

5. The delayed foam producing apparatus of claim 1 wherein said mechanics for drawing said liquid from said contained liquid source and moving said liquid through said liquid conducting system is an auxiliary powered pump.

6. The delayed foam producing apparatus of claim 1 wherein said means for controlling said mechanics is an on/off and speed graduated throttle control remotely operational.

7. The delayed foam producing apparatus of claim 1 wherein said contained foam producing concentrate source being a refillable portable container.

8. The delayed foam producing apparatus of claim 1 wherein said concentrate measuring and proportioning device is a pressure sensing proportioning valve affixed in said conduit between said foam producing concentrate source and said major passageway.

9. The delayed foam producing apparatus of claim 1 wherein said mixing and pressurizing device is a booster pump.

10. The delayed foam producing apparatus of claim 1 wherein said controllable connective access to a liquified gas source is a regulative electronic switch on a portable liquified gas cylinder.

11. The delayed foam producing portable liquified gas cylinder of claim 10 wherein said portable lignified gas cylinder is a CO2 gas cylinder.

12. The delayed foam producing apparatus of claim 1 wherein said gas injection and mixing chamber being a stressed tubular insert in said liquid conducting system.

13. The delayed foam producing apparatus of claim 1 wherein said adjustable fluid flow directional control device attached at said opened output end of said major passageway being a controllable flow aiming monitor.

14. The delayed foam producing apparatus of claim 1 wherein said means for imitating and controlling said fluid flow directional control device being an electric activator remotely controlled.

15. The delayed foam producing apparatus of claim 1 wherein said flow conditioning fixture being a columnar flow nozzle with aiming mechanics attached.

16. The delayed foam producing apparatus of claim 1 wherein said means for replenishing a depleted liquid supply is a fluid intake hose useful with a self powered snorkel and with other fluid moving methods for replenishing said contained water source.

17. A delayed action foam producing method for emergency foam delivery systems comprising:
a liquid;
a foam producing concentrate;
a liquified gas;
a containment means wherein said liquid is induced into said containment means at an input end, conducted through said containment means in conditioning stages, and ejected from said containment means at an output end;
a first of said conditioning stages in said containment means whereat small measured amounts of said foam producing concentrate is coursed into large measured amounts of said liquid;
a second of said conditioning stages in said containment means whereat said foam producing concentrate and said liquid are thoroughly mixed and pressurized producing a pressurized mix;
a third of said conditioning stages in said containment means whereat said pressurized mix is restrained from passage further along until a preset pressurization is achieved and automatically released as a highly pressurized mix;
a fourth of said conditioning stages in said containment means whereat said pressurized mix is injected with controlled amounts of said liquified gas producing thereafter a gas charged pressurized mix;
a high pressure passage of said gas charged pressurized mix towards said output end of said containment means;
said ejection of said gas charged pressurized mix at said output end of said containment means directively controlled and released in extended "columnar flow" form.

18. The delayed action foam producing method of claim 17 wherein said liquid is water.

19. The delayed action foam producing method of claim 17 wherein said foam producing concentrate is a liquid protein mixture.

20. The delayed action foam producing method of claim 17 wherein the concentrate is particularly formulated as a fire retardant for type A wood related fires.

21. The delayed action foam producing method of claim 17 wherein the concentrate is particularly formulated as a fire retardant for type B petroleum related fires.

22. The delayed action foam producing method of claim 17 wherein the concentrate is formulated as a chemical spill naturalizing agent according to the nature of the chemical spill.

23. The delayed action foam producing method of claim 17 wherein said liquified gas is pressurized C02.

24. The delayed action foam producing method of claim 17 wherein said liquified gas is pressurized CO2. foam producing concentrate is coursed into large measured amounts of said liquid said measured amounts being determined according to the specifications of the foam producing concentrate requirements with said measured amounts being approximately three gallons of foam producing concentrate to one hundred gallons of liquid when said liquid is water.

25. The delayed action foam producing method of claim 17 wherein foam producing concentrate being a dry protein mixture.

* * * * *